June 2, 1931.  W. F. STIMPSON ET AL  1,808,269
COMPUTING SCALE
Filed Dec. 15, 1927   4 Sheets-Sheet 1

Inventors
Walter F. Stimpson
Willis E. Finch

By Swan, Frye & Murray
Attorneys

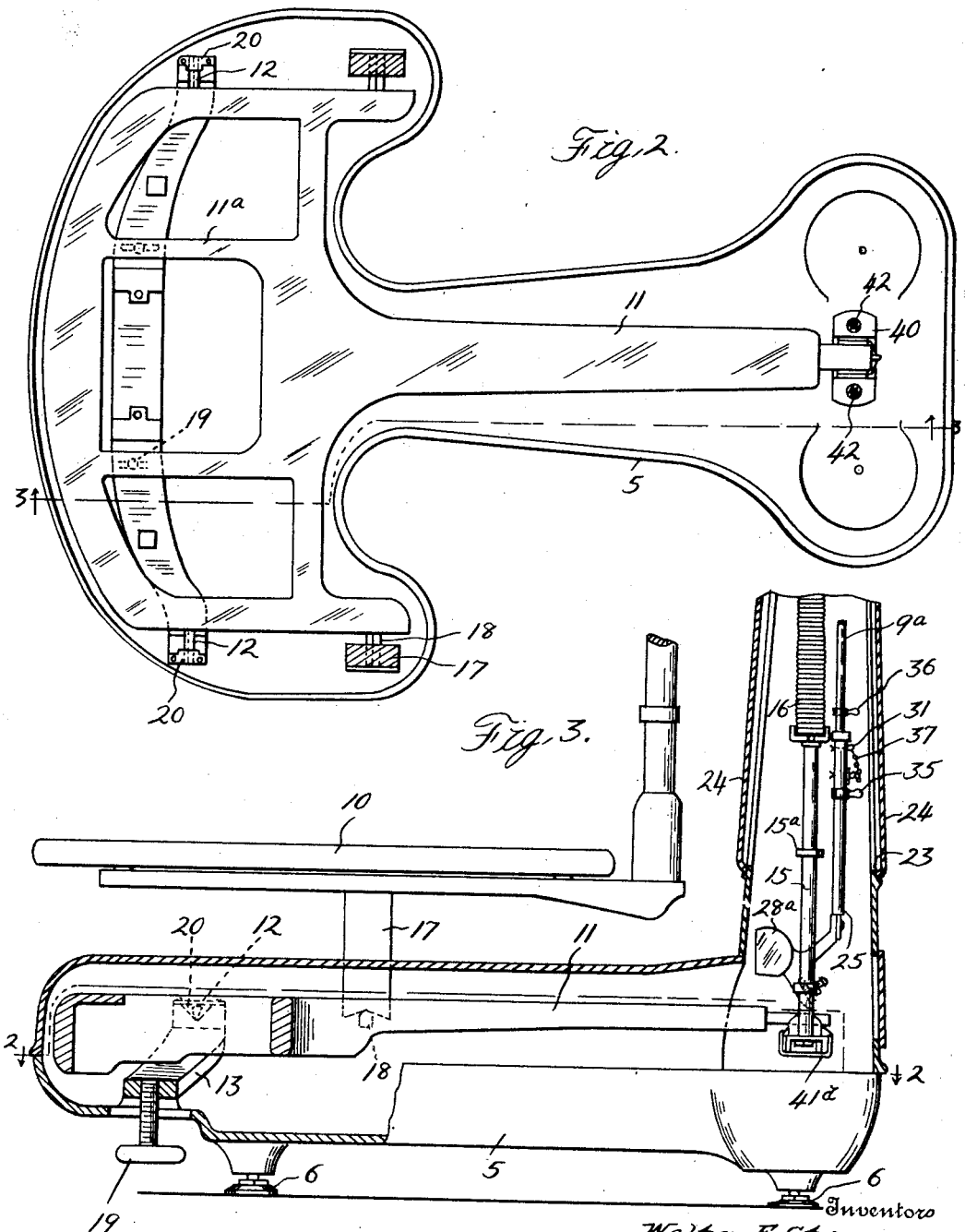

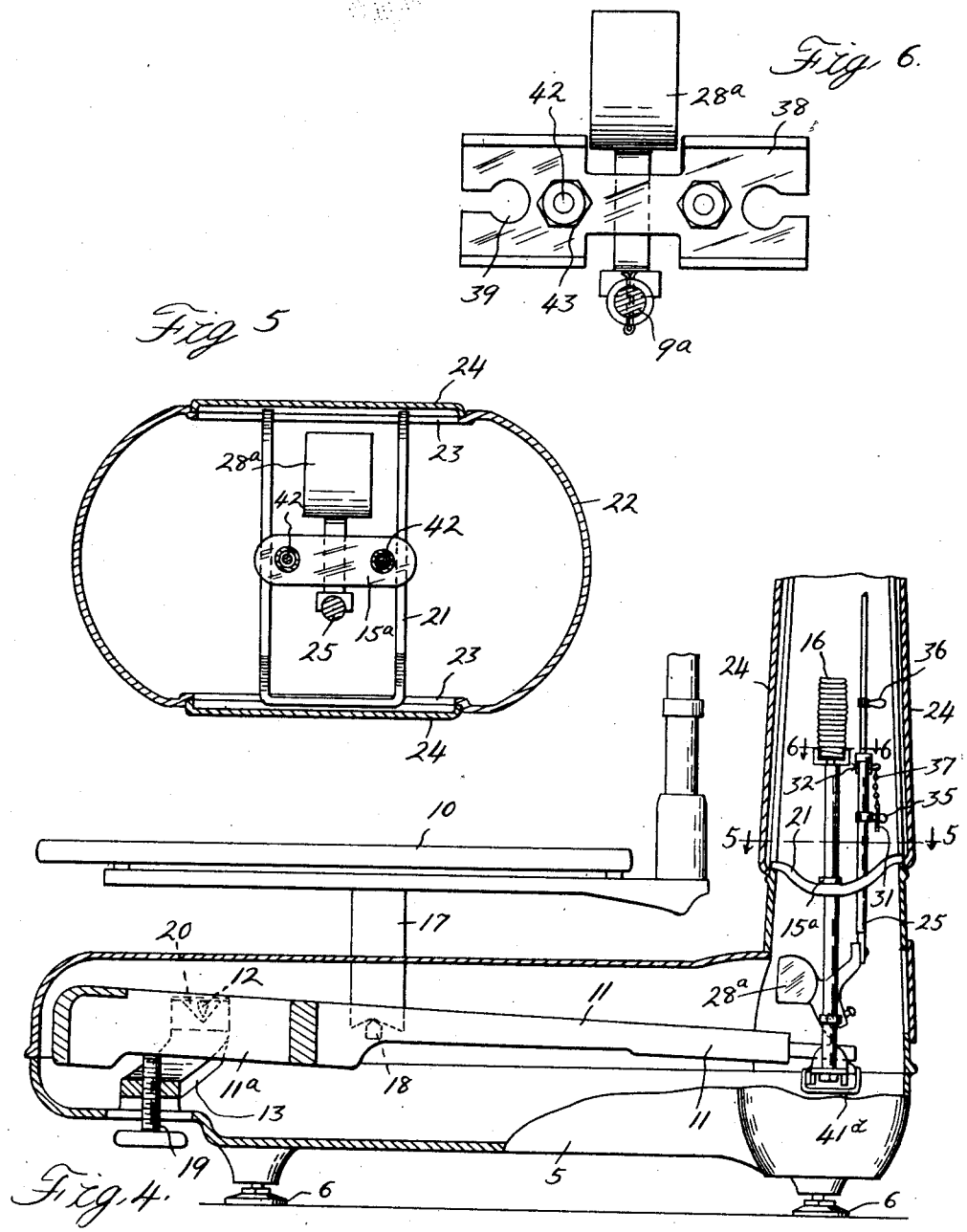

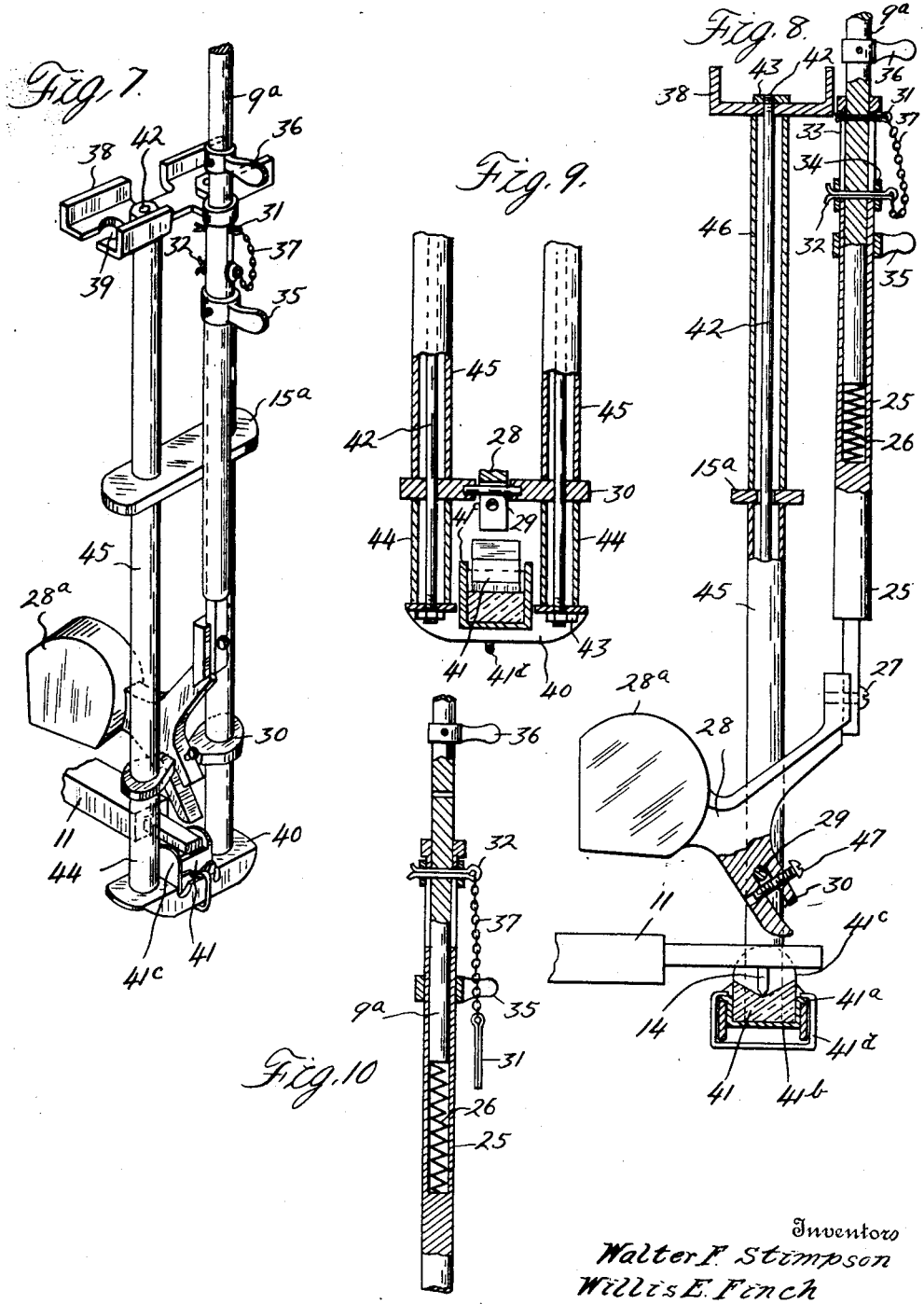

Patented June 2, 1931

1,808,269

UNITED STATES PATENT OFFICE

WALTER F. STIMPSON AND WILLIS E. FINCH, OF LOUISVILLE, KENTUCKY; SAID FINCH ASSIGNOR TO SAID STIMPSON

COMPUTING SCALE

Application filed December 15, 1927. Serial No. 240,102.

This invention relates to improvements in computing scales, and particularly to that type of computing scales known as counter scales.

One of the objects of the present invention is the provision of means whereby the main scale beam may be lifted to remove the fulcrum pivots from engagement with their bearings, while the scale is being transported, and also depress the nose iron pivot of the scale beam to draw downwardly the connecting frame between such pivot and the counterbalancing springs to thereby put the springs under initial tension, and then secure such frame against wobbling while the scale is being transported.

Another object of this invention is the mounting of the rack rod upon the connecting frame between the main scale beam and load counter-balancing means whereby it may be vertically moved in proportion to the extent of movement of the counter-balancing means while the scale is in operation but may be readily disconnected from such supporting frame and cushioned against shock while the scale is being transported.

A further object of this invention is the novel arrangement of the connecting frame between the scale beam and load counterbalancing means providing ready adjustment of the counter-balancing means, ready mounting of the bearing for the nose iron pivot and convenient means for permitting the secural of the scale beam and associated parts during transportation.

Other objects and advantages will be apparent from the following description, wherein reference is made to the accompanying drawings, illustrating a preferred embodiment of my invention and wherein similar reference numerals designate similar parts throughout the several views.

In the drawings:

Figure 2 is a plan view of the main scale beam mounted within the lower portion of the scale casing, the view being taken substantially on the line 2—2 of Figure 3.

Figure 3 is a vertical sectional view through the lower portion of the scale taken substantially on the line 3—3 of Figure 2, and showing the main scale beam in position for weighing.

Figure 4 is a similar view but with the scale beam raised at its rear extremity to lift the fulcrum pivots from their bearings and to depress the forward extremity.

Figure 1:
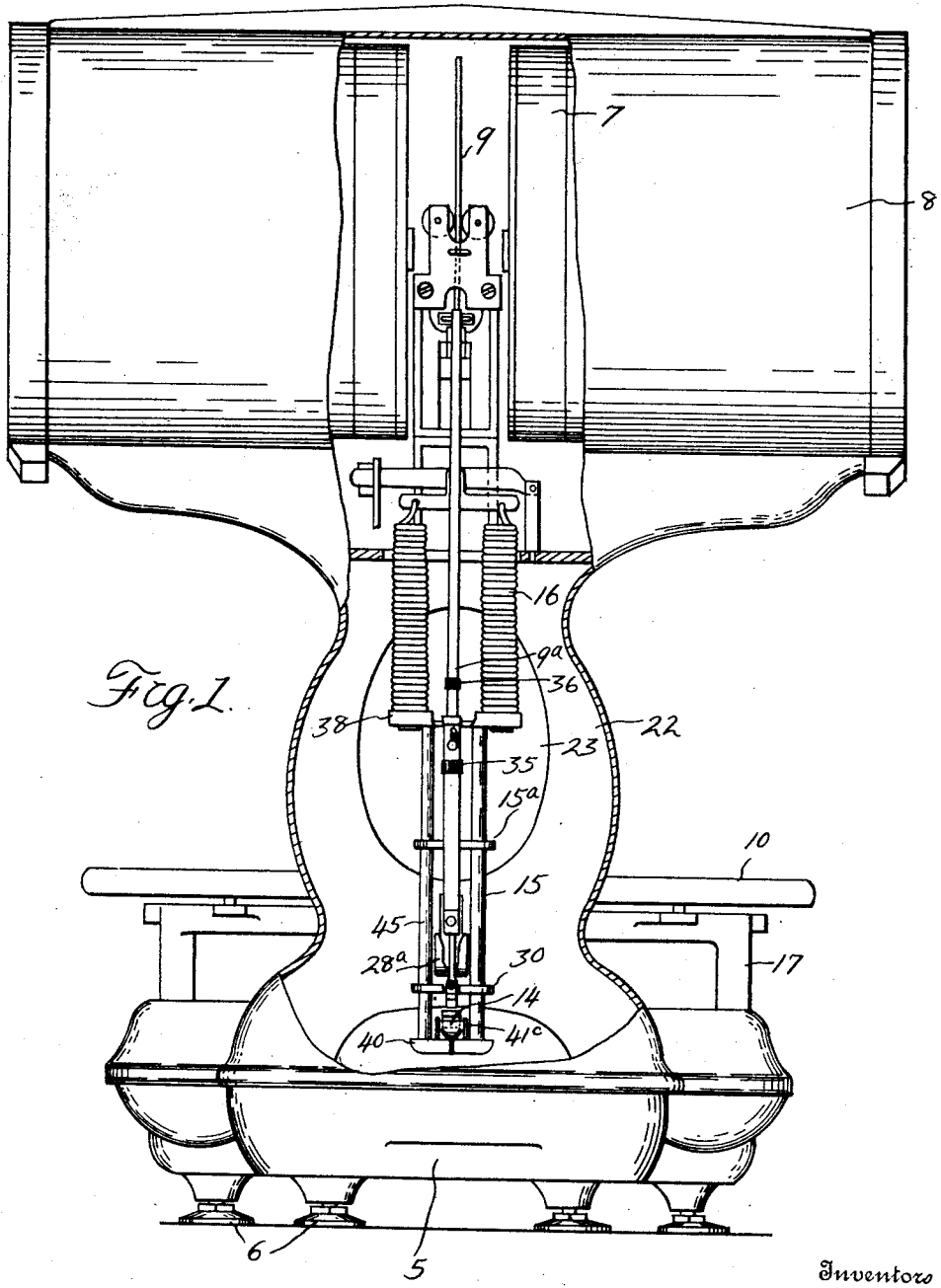
Figure 1 is a rear elevation of a scale constructed in accordance with this invention, the casing being broken away to show the interior arrangement.

Figures 5 and 6 are detail cross-sectional views taken substantially on the lines 5—5 and 6—6 of Figure 4.

Figure 7 is a detail perspective view showing the assembly of the intermediate frame arranged between the scale beam and the load counter-balancing springs.

Figure 8 is an enlarged vertical section through the parts shown in Figure 7.

Figure 9 is a detail sectional view through the lower portion of the intermediate frame and associated parts shown in Figure 7, and Figure 10 is a detail sectional view showing the mounting of the rack rod when the scale is ready for transportation.

Referring now to the drawings, the numeral 5 designates the base of a weighing scale herein shown as of the counter type, and provided with a plurality of adjustable feet 6 adapted to rest upon a counter or other support with the base 5 leveled by suitable adjustment of the feet 6. The scale herein shown is of the computing type, the computations as well as the weight indications being carried upon a pair of cylinders 7 rotatably mounted within an upper casing 8 in position to be rotated upon vertical movement of a rack 9 connected for simultaneous movement with moving parts of the scale adapted to be set in motion whenever a commodity to be weighed is placed upon the scale platform 10. Various means may be utilized for rotating the indicating cylinders 7 from the scale platform 10, but for purposes of exemplification, we have shown herein a main scale beam 11 fulcrumed by pivots 12 upon brackets 13 carried upon the base 5 and provided with a nose iron pivot 14 at a distance from the fulcrum pivots 12, which nose iron pivot rests upon a bearing carried by a frame 15. The frame 15 is suitably connected with a pair of load counter-balancing springs 16 and also supports the rack rod 9a, whereby downward movement of the frame due to swinging of the lever 11 on its fulcrum pivots 12 will simultaneously extend the counter-balancing springs 16 and move the rack 9 to rotate the indicating cylinders 7. The scale platform 10 is supported upon the scale beams 11 intermediate the fulcrum pivots 12 and nose iron pivots 14 of the scale beam, as by means of a pair of supports 17 resting upon upturned pivots 18 upon the scale beam.

The above described scale mechanism is herein illustrated only for purposes of exemplification, and is in the main like that disclosed in various prior patents.

However, various improvements in the arrangement of certain of the parts of such system are herein disclosed for the first time, and form claimed subject matter hereof, and also improvements in the manner of securing certain of the moving parts of the scale mechanism for protection during transportation of the scale forms claimed subject matter hereof.

The provision for securing the moving parts of the weighing mechanism during transportation of the scale will now be described. As best illustrated in Figures 2, 3 and 4, a pair of thumb screws 19, or the like, are threaded in the bracket 13 normally carrying the bearings for the fulcrum pivots 12 of the scale beam, the thumb screws being placed at opposite sides of the longitudinal central axis of the scale beam and also located at a distance rearwardly of a horizontal line connecting the two fulcrum pivots 12 of the scale beam (note Figure 2). This arrangement permits the set screws 19, when turned, to bring their stems upwardly a sufficient distance to engage portions 11a of the scale beam, and then upon further upward movement of the set screws, to lift the rear extremity of the scale beam until the fulcrum pivots 12 are removed from engagement with their normal bearings and brought into contact with plates 20 secured to the brackets 13 above the fulcrum pivots 12. The upper surfaces of the fulcrum pivots 12 are preferably curved substantially as shown in Figures 3 and 4, so that after engagement of such curved surfaces of the fulcrum pivots 12 with the stop plates 20 further upturning of the set screws 19 will tend to swing the scale beam 11 with such curved surfaces as pivots. Such swinging of the scale beam brings about a raising of the rear extremity of the scale beam and a depression of the forward extremity of the scale beam carrying the nose iron pivot 14, the scale beam then assuming a position substantially like that shown in Figure 4. The depression of the nose iron pivot 14 serves to draw downwardly the intermediate frame 15 and elongate the counter-balancing springs 16, and to limit such downward movement of the frame 15 and extension of the spring 16, we preferably provide a stop member 21 substantially as shown in Figures 4 and 5. The stop member 21 may be substantially U-shaped in plan view with its arms bowed in side view, the ends of the arm being adapted to rest upon suitable ledges upon the scale casing while the central portion of such arms are engaged on their upper surfaces by a cross bar 15a of the intermediate frame 15. As herein shown, we have provided in the scale casing a central column 22 resting upon the lower portion 5 of the casing and either constructed with or suitably supporting the upper portion 8 of the casing enclosing the indicating cylinders 7. In the front and rear of such column 22 we provide openings 23, the lower edges of which are slightly below the normal position of the cross bar 15a of the frame 15 (note Figure 3). When, however, the cross bar 15a and frame 15 are drawn downwardly by the depression of the nose iron pivot 14, as hereinbefore described, the cross bar 15a is moved below the lower extremity of the openings 23 a sufficient distance to bring it into contact with the central portions of the arms of the stop member 21, when the ends of the stop member are resting upon the lower portions of said openings, substantially as shown in Figures 4 and 5. The openings 23 may be closed whenever desired by cover members 24.

This arrangement provides means for effectively bracing the rear extremity of the scale beam 11 with the fulcrum pivots 12 lifted out of contact with their bearings, the set screws 19 serving to so lift the rear portion of the scale beam and also force the forward extremity of the scale beam downwardly a sufficient distance to bring the cross bar 15a of the frame 15 connected with the forward portion of the scale beam into firm engagement with the stop member 21 whenever the stop member is positioned between the lower extremities of the openings 23 in the scale casing. Accordingly, both extremities of the scale beam are braced during transportation of the scale, and the extension of the spring 16, as hereinbefore described, serves to aid in holding all moving parts of the scale mechanism against accidental shifting from their desired positions. It has been found desirable, however, to relieve the indicating mechanism of the scale from positive connection with the extended springs 16 during transportation of the scale and cushion the rack rod 9a of such indicating means. This is accomplished by the means best illustrated in Figures 3, 4, 8 and 10. The rack rod 9a extends within the open upper extremity of the guide cylinder 25 and rests upon a light coil spring 26 arranged between the lower extremity of the opening in the cylinder 25 and the bottom of the rack rod. The cylinder 25 is in turn connected, as by a screw 27, with a weighted rack foot 28 pivotally mounted upon a rounded pivot 29 carried between spaced cross bars 30 of the intermediate frame 15. The weight 28$^a$ of the rack foot is so arranged relatively to the pivot 29 as to over-balance the rack rod and associated parts sufficiently to maintain the teeth of the rack 9 into constant engagement with the pinion with which it cooperates (not shown). To insure maintenance of the pivot 29 with the weighted rack foot we preferably provide a slot 30 in the lower extremity of the rack foot, the upper wall of the slot being rounded to substantially conform with the surface of the pivot 29. One wall of the rack foot may also be extended downwardly a sufficient distance to serve as a stop for preventing the accidental dislocation of the nose iron pivot 14 from its bearing (note Figure 8). By virtue of this construction the vertical movements of the frame 15 will serve to raise or lower the rack 9 and associated parts, the rack rod being held in a substantially fixed position within the cylinder 25 while the scale is being used for weighing operations by means of a pair of cotter pins 31 and 32, or the like, arranged through apertures in the rack rod 9$^a$ and normally engaging against the top and bottom walls of a pair of aligned elongated slots 33 formed in the upper extremity of the cylinder 25. The lowermost cotter pin 32 carries adjacent its extremities a pair of washers 34 of sufficient width to engage the sides of the elongated slots 33. As long as the scale is being used for weighing operations both cotter pins 31 and 32 are positioned substantially as shown in Figures 3 and 8, and the effect is that of a rigidly connected rack rod and cylinder. When, however, it is desired to prepare the scale for transportation, the uppermost cotter pin 31, is withdrawn from its normal position, whereupon the light spring 26 within the cylinder 25, which has been compressed during the normal operations of the scale, will lift the rack rod 9$^a$ the distance permitted by the movement of the lower cotter pin 32 within the elongated slots 33 (note Figure 10) and will thereafter serve as a cushion for the rack rod in its partially disconnected position relatively to the cylinder 25. When it is again desired to restore the scale to its normal operative condition, it is necessary to again lower the rack rod 9$^a$ against the tension of the spring 26 until the upper cotter pin 31 may be restored to its normal position adjacent the upper extremities of the slots 33. To enable the convenient repositioning of the rack rod, we preferably provide a pair of finger pieces 35 and 36 upon the cylinder 25 and rack rod 9$^a$ respectively (note Figures 7, 8 and 10). To prevent accidental loss of the upper cotter pin 31 after it has been withdrawn from its normal position we preferably connect it with the lower cotter pin 32, as by a flexible attaching member 37.

The intermediate frame 15 is preferably arranged substantially as shown in Figures 7-10, and comprises an upper member 38, provided with a pair of substantially keyhole shaped apertures 39 adjacent its sides for the reception of a pair of adjusting screws or the like carried by the springs 16, and a lower member 40 arranged to carry the bearing 41 for the knife-edged pivot 14 of the main scale beam 11. Said upper and lower members 38 and 40 are connected by means of a pair of spaced elongated bolts 42 extending through apertures in said members, nuts 43, or the like, being provided for preventing accidental dislocation of the members 38 and 40 from the bolts 42 and also for effecting adjustments of the distance between said members. Each of the bolts 42 is surrounded by a plurality of spacer sleeves, as best shown in Figures 8 and 9. These spacer sleeves serve to prevent movement of the upper and lower members 38 and 40 toward each other beyond a predetermined minimum and also serve to position the cross bars 15$^a$ and 30 hereinbefore described. Thus the cross bar 30 is spaced a desired distance above the lower frame member 40 by means of a pair of spacer sleeves 44 and the cross bar 15$^a$ is positioned a desired distance above the cross bar 30 by means of a pair of spacer sleeves 45, and the upper frame member 38 is positioned a predetermined distance above the cross bar 15$^a$ by means of a pair of spacer sleeves 46. By virtue of this construction, the intermediate frame 15 may be readily and quickly assembled and the several cross bars and frame members accurately positioned at predetermined distances from each other by merely turning the nuts 42 until the several spacer sleeves are brought into firm engagement with the members they are designed to space.

The lower frame member 40 is provided with an aperture at substantially its central portion for the reception of the bearing 41 of the nose iron pivot 14 and the support 41$^b$ in which said bearing is mounted. The front and rear walls of this central aperture in the lower frame member 40 are aligned on their upper surfaces and form elongated supports for a pair of V-shaped ears 41$^a$ extending laterally from the support 41$^b$ in which the bearing 41 is mounted. Preferably the V-shaped ears 41$^a$ are located substantially centrally of the sides of the support 41$^b$ and the apex of the V is rounded so as to permit the rocking of the bearing 41 and its support 41$^b$ on the V-shaped ears 41$^a$ as pivots. Such rocking movements are limited, however, by the side walls of the central aperture in the lower frame member 40. The support 41$^b$ for the bearing 41 is herein shown as a substantially oblong receptacle for the bearing 41, which preferably is of agate or other suitable material having a substantially V-shaped notch in its upper face extending entirely across the bearing. The ends of this notch in which the nose iron pivot 14 is normally resting are closed by the side plates 41ᶜ of the bearing support, which, as best shown in Figures 7 and 9, extend above the upper surface of the bearing 41. This arrangement provides a novel self-aligning bearing whereby the nose iron pivot 14 may maintain the engagement of its entire knife edge within the V-notch of the bearing. Such self-alignment is brought about because the bearing support 41ᵇ may slide bodily in lateral directions or rock on its V-shaped ears 41ᵃ to bring the surface of the bearing 41 into full contact with the entire knife edge of the pivot 14 despite rocking or lateral movements of the frame 15 and the scale beam carrying the pivot 14. As best illustrated in Figures 8 and 9, we provide means for preventing accidental dislocation of the nose iron pivot 14 from its bearing, as for example when a comparatively heavy commodity is suddenly dropped on the scale platform, by extending the lowermost portion of the weighted rack foot 28 to a position above the scale beam 11 less than the distance which the pivot 14 would have to move to disengage itself from its bearing 41. The weighted rack foot 28 moves with the scale beam 11 and its nose iron pivot 14 and is prevented from accidentally becoming separated from the intermediate frame 15 on which it is pivotally mounted by a set screw 47 threaded into apertures in the opposite walls of the slot 30 in the rack foot. It will also be noted that by threading the set screw 47 into both of the walls of the slot 30, means are provided for retracting the set screw 47 sufficiently to clear the slot 30 and yet remain fastened adjacent the slot so that it will not become lost when the rack foot is detached from the frame 15 and can be quickly and conveniently repositioned into the position shown in Figure 8 after the rack foot has been again restored to its position upon the frame 15. To prevent accidental dislocation of the bearing support 41ᵇ from the lower frame member 40 we preferably provide a bail 41ᵈ of spring wire, or the like, arranged substantially as shown in Figures 7 and 8. The bail 41ᵈ has its extremities sprung into the V-shaped ears 41ᵃ of the support 41ᵇ and extends downwardly along the sides and across the bottom of the lower frame member 40.

The operation of the scale is believed to be apparent. Whenever a commodity is deposited upon the scale platform 10 the main scale beam 11 is swung on its fulcrum pivots 12 to depress the nose iron pivot 14 and so draw downwardly upon the counter-balancing springs 16, extending said springs until the weight of the commodity has been counter-balanced. The intermediate frame 15 is simultaneously drawn downwardly to the extent permitted by the extension of the spring 16 and the rack foot 9 pivotally mounted upon such frame is likewise lowered to the same extent, the movement of the rack serving to rotate the indicating cylinder 7 through arcs proportionate to the counter-balancing action of the springs 16. The peripheries of the indicating cylinders 7 carry properly positioned numerals whereby the weight of the commodity on the scale platform is shown through suitable windows in the casing 8, and may also carry computations to show the value of the commodity being weighed at various prices per pound in the usual manner of computing scales. When the commodity is removed from the scale platform, the force of the springs returning to their original positions is utilized to restore the several moving parts of the scale to their original positions and the scale is ready for weighing another commodity.

What we claim is:

1. In a weighing scale having a lever and counter-balance springs connected thereto, of adjustable means movable into contact with the lever for swinging the lever independently of a weighing operation to extend the springs and maintain both of said members in their adjusted positions as long as desired.

2. In a weighing scale having a lever and counter-balance springs connected thereto, of adjustable means movable into contact with the lever for swinging the lever independently of a weighing operation to extend the springs and maintain both of said members in their adjusted positions as long as desired, and a stop member arranged to limit the extension of the springs by said means.

3. In a weighing scale having a casing, a bracket carrying pivot bearings, a lever normally fulcrumed in said bearings, and load counter-balancing springs connected to the lever, of adjustable means carried by the bracket for swinging the lever to extend the springs and maintain both the lever and springs in their adjusted positions as long as desired.

4. In a weighing scale having a casing, a bracket carrying pivot bearings, a lever normally fulcrumed in said bearings, and load counter-balancing springs connected to the lever, of adjustable means carried by the bracket for swinging the lever to extend the springs and maintain both the lever and springs in their adjusted positions as long as desired, and a stop member arranged to limit the extension of the springs by said means.

5. In a weighing scale having a casing, a bracket carrying pivot bearings, a lever normally fulcrumed in said bearings, and load counter-balancing springs connected to the lever, of adjustable means carried by the bracket for swinging the lever to extend the springs and maintain both the lever and springs in their adjusted positions as long as desired, and a stop member detachably carried by the casing and arranged to limit the extension of the springs by said means.

6. In a weighing scale having a casing, a bracket carrying pivot bearings, a lever normally fulcrumed in said bearings, and load counter-balancing springs connected to the lever, of locking means for the lever and springs comprising a set screw adjustably mounted in said bracket out of line with the fulcrum pivots whereby adjustment of the set screw will swing the lever to extend the springs and maintain the extension as long as desired.

7. In a weighing scale having a casing, a bracket carrying pivot bearings, a lever normally fulcrumed in said bearings, and load counter-balancing springs connected to the lever, of locking means for the lever and springs comprising spaced set screws adjustably mounted in said bracket in position to engage the lever on the opposite side of the fulcrum pivots from its point of connection with the springs, whereby adjustment of the set screws will lift the fulcrum pivots of the lever from their normal bearings, and a pair of plates arranged to limit such upward movement of the fulcrum pivots.

8. In a weighing scale having a casing, a bracket carrying pivot bearings, a lever normally fulcrumed in said bearings, and load counter-balancing springs connected to the lever, of locking means for the lever and springs comprising spaced set screws adjustably mounted in said bracket in position to engage the lever on the opposite side of the fulcrum pivots from its point of connection with the springs, whereby adjustment of the set screws will lift the fulcrum pivots of the lever from their normal bearings, and a pair of plates arranged to limit such upward movement of the fulcrum pivots and form temporary bearings on which said pivots may swing upon further adjustment of the set screws to thereby extend said springs, and a stop member carried by the casing in position to limit such extension of the springs.

9. In a weighing scale having a casing, a bracket carrying pivot bearings, a lever normally fulcrumed in said bearings, and load counter-balancing springs connected to the lever, of adjustable means carried by the bracket for swinging the lever to extend the springs and maintain both the lever and springs in their adjusted positions as long as desired, the casing being provided with shoulders above said lever, and a U-shaped stop member adapted to rest on the shoulders of the casing in position to limit the extension of the springs by said means.

10. In a weighing scale having a casing, a bracket carrying pivot bearings, a lever normally fulcrumed in said bearings, and load counter-balancing springs connected to the lever, of adjustable means carried by the bracket for swinging the lever to extend the springs and maintain both the lever and springs in their adjusted positions as long as desired, a part of the connection between the lever and springs comprising a frame having a cross bar, and a stop member carried by the casing in position to be engaged by said cross bar to limit the extension of the springs by said means.

11. In a weighing scale, a casing, a lever fulcrumed thereon, a pair of counter-balancing springs supported at their upper ends upon the casing, and means for connecting the lever to said springs comprising an intermediate frame having a lower member and an upper member connected together by elongated bolts and spaced apart by a plurality of spacer sleeves and cross bars, the upper member being connected to said springs and the lower member being engaged by the lever.

12. In a weighing scale, a casing, a lever fulcrumed thereon, a pair of counter-balancing springs supported at their upper ends upon the casing, and means for connecting the lever to said springs comprising an upper member provided with slots for receiving the lower extremities of said springs, a lower member adapted to support the free extremity of the lever, and connecting means between said upper and lower members comprising elongated bolts and spacer sleeves arranged to space the upper and lower members at predetermined distances from each other.

13. In a weighing scale, a casing, a lever fulcrumed thereon, a pair of counter-balancing springs supported at their upper ends upon the casing, and means for connecting the lever to said springs comprising an upper member provided with slots for receiving the lower extremities of said springs, a lower member adapted to support the free extremity of the lever, elongated bolts arranged to connect the upper and lower members to each other, and a plurality of spacer sleeves and cross bars arranged between the upper and lower members to space said members by predetermined distances and space the cross bars relatively to said members.

14. In a weighing scale, a casing, a lever fulcrumed thereon, a pair of counter-balancing springs supported at their upper ends upon the casing, and means for connecting the lever to said springs comprising an upper member provided with slots for receiving the lower extremities of said springs, a lower member adapted to support the free extremity of the lever, elongated bolts arranged to connect the upper and lower members to each other, and a plurality of spacer sleeves and cross bars arranged between the upper and lower members to space said members by predetermined distances and space the cross bars relatively to said members, and indicating mechanism actuated upon movement of said intermediate frame, including a rack rod pivotally mounted upon one of said cross bars.

15. In a weighing scale, a casing, a lever fulcrumed thereon, a pair of counter-balancing springs supported at their upper ends upon the casing, and means for connecting the lever to said springs comprising an upper member provided with slots for receiving the lower extremities of said springs, a lower member adapted to support the free extremity of the lever, elongated bolts arranged to connect the upper and lower members to each other, and a plurality of spacer sleeves and cross bars arranged between the upper and lower members to space said members by predetermined distances and space the cross bars relatively to said members, one of said cross bars carrying a pivot, and indicating mechanism operable upon movement of said frame and including a rack rod pivotally mounted upon the pivot of said cross bar.

16. In a weighing scale having a casing, a lever fulcrumed thereon, load counter-balancing springs supported at one extremity upon the casing, indicating means movably mounted upon the casing, and connections between the lever and springs, of means for actuating said indicating mechanism upon movement of said lever including a pinion carried by the indicating means, a rack meshing therewith and having a rack rod, and a rack foot pivotally mounted upon said connections between the lever and springs, and having an open-ended cylindrical portion arranged to telescopically receive the rack rod, a spring arranged within the cylinder to cushion the rack rod while the scale is not being used for weighing purposes, and means for removably securing the rack rod to the rack foot preventing relative movements therebetween during weighing operations.

17. In a weighing scale having a casing, a lever fulcrumed thereon, load counter-balancing springs supported at one extremity upon the casing, indicating means movably mounted upon the casing, and connections between the lever and springs, of means for actuating said indicating mechanism upon movement of said lever including a pinion carried by the indicating means, a rack meshing therewith and having a rack rod, a rack foot pivotally mounted upon said connections between the lever and springs, and having an open-ended cylindrical portion arranged to telescopically receive the rack rod, and means for removably securing the rack rod and cylinder together to prevent relative movements therebetween during weighing operations.

18. In a weighing scale having a casing, a lever fulcrumed thereon, load counter-balancing springs supported at one extremity upon the casing, indicating means movably mounted upon the casing, and connections between the lever and springs, of means for actuating said indicating mechanism upon movement of said lever including a pinion carried by the indicating means, a rack meshing therewith and having a rack rod, and a rack foot pivotally mounted upon said connections between the lever and springs, and having an open-ended cylindrical portion arranged to telescopically receive the rack rod, and a spring arranged within the cylinder to cushion the rack rod, the cylinder being formed with aligned elongated slots and the rack rod with spaced apertures adapted to align with said slots, and means operable through said slots and apertures for preventing relative movements between the rack rod and cylinder.

19. In combination with a weighing scale having a platform supporting lever and counter-balance springs connected thereto, laterally spaced pivots carried by the lever, fixed bearings normally receiving said pivots, and means mounted intermediate said pivots and movable into engagement with the lever to lift said pivots away from said bearings and extend said springs whenever desired.

In witness whereof we hereunto set our hands.

WALTER F. STIMPSON.
WILLIS E. FINCH.